J. FLAMMANG.
PISTON.
APPLICATION FILED SEPT. 24, 1919.
1,378,671.
Patented May 17, 1921.
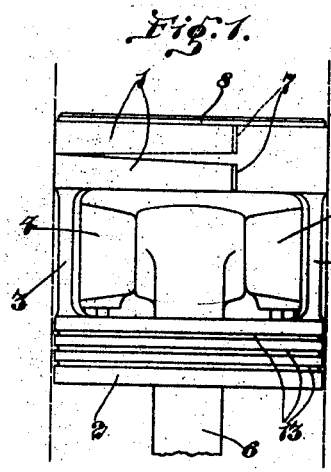
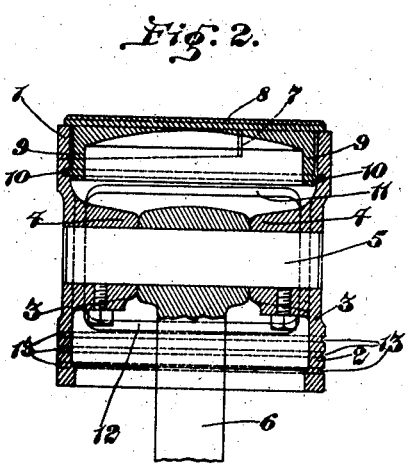
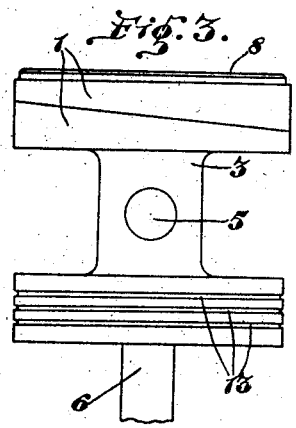
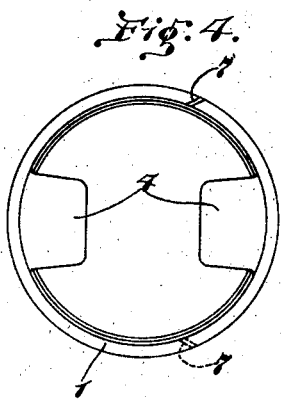
Inventor:
John Flammang,
by Rippey & Kingsland
His Attorneys.
Attest:
Charles A. Becker

UNITED STATES PATENT OFFICE.

JOHN FLAMMANG, OF UNIVERSITY CITY, MISSOURI, ASSIGNOR TO OTTMAR G. STARK, OF ST. LOUIS, MISSOURI.

PISTON.

1,378,671.  Specification of Letters Patent.  Patented May 17, 1921.

Application filed September 24, 1919. Serial No. 325,994.

*To all whom it may concern:*

Be it known that I, JOHN FLAMMANG, a citizen of the United States, residing at University City, St. Louis county, and State of Missouri, have invented a new and useful Piston, of which the following is a specification.

This invention relates to pistons.

An object of the invention is to provide a piston which is split at one end thereof to form an annular member having overlapping end portions or sections, which annular member is integrally united with the piston body and functions to press against the wall of the cylinder in which the piston operates to form a seal to prevent the passage of gas, steam or other operating fluid between the piston and the cylinder wall.

Another object of the invention is to provide a piston constructed and characterized to function as stated, and provided with a top plate which may be, and preferably is, detachable from the piston body.

With the foregoing and other objects in view, all of which will hereinafter appear, the piston may be made in any desired form which embodies the essentials of the construction, functioning to attain the results mentioned, and one form of such piston is shown in the accompanying drawing in which:—

Figure 1 is an elevation of the piston, having the split resilient portion thereof compressed to the position which it occupies when the piston is within a cylinder.

Fig. 2 is a vertical sectional view of the piston.

Fig. 3 is a side elevation of the piston looking toward another side from that shown in Fig. 1.

Fig. 4 is a view looking toward the head of the piston body with the head plate removed.

As shown in the drawings, the piston body comprises a hollow casting having the upper portion thereof split to form an annular member having overlapping segmental end portions 1. The segmental end portions 1 are preferably superimposed one upon the other in order to make contact with each other, and they may extend for any desired distance around the piston body. For the purpose of making the piston light and the attainment of other benefits, the piston body may have portions of the side walls thereof removed or omitted below the split annular member in order to provide a lower ring 2 integrally connected with the upper resilient annular portion of the piston by integral connections 3. The connections 3 may be formed with bosses 4 to support the wrist pin 5 to which the pitman rod 6 is connected. The slit separating the overlapping segmental end portions 1 of the annular upper portion of the piston is preferably spiral in formation, to the extent that one of the ends of the slit is nearer the upper edge of the annular member than it is to the lower edge of said member; and the opposite end of the slit is nearer the lower edge of the annular member than it is to the upper edge of said member. At the ends of the slit, notches or cuts 7 are formed leaving the narrowest ends of the overlapping segmental portions free and disconnected from the adjacent portions of the piston body. This permits the resilient overlapping ends to function as required to maintain a perfect seal with the wall of the cylinder, thus dispensing with the necessity of the use of piston rings or other forms of packing in connection with the piston.

In the manufacture of the piston the resilient overlapping segmental sections or ends are compressed until the gaps 7 are closed or nearly closed. While held in such compressed position the annular member of the piston, comprising the overlapping segmental sections or ends, is ground or otherwise finished to a size equal, or approximately equal, to the size of the cylinder in which the piston is intended to operate. The result of this construction is that, when the piston is placed within a cylinder, the resilient annular member, having overlapping segmental sections or ends, will press outwardly in all directions against the cylinder wall and will function as a seal to prevent the passage of gas, steam or other fluid between the piston and the cylinder.

In Fig. 1, the vertical dotted lines at the sides of the piston may be assumed to indicate the position of the inner surface of the wall of the cylinder containing the piston. It will be observed that the resilient annular split portion of the piston presses closely against the cylinder wall, while the remaining portion of the piston body is formed slightly smaller than the bore of the cylinder. This permits the piston to operate freely and at the same time form a seal with the cylinder wall to prevent the passage of gas, steam or other fluid between the piston and the cylinder.

I provide a head, or top plate, in connection with the piston body. In the embodiment shown in the drawings, the head, or top plate, is detachable from the piston body and may be removed and replaced as desired. As shown, the head, or top plate, comprises a head 8 arranged to seat upon the upper end of the piston body. The plate 8 is provided with a cylindrical portion 9 extending into the piston body, and having interlocking connection with the piston body by means of a circumferential flange 10, engaging within a matching groove on the other part. The parts are so constructed that they do not interfere with the functioning of the resilient portion of the piston body to form a seal with the cylinder wall.

Preferably, the lower edge of the resilient annular split member is beveled to provide a scraping edge 11 and the upper edge of the lower portion 2 is beveled to provide a scraping edge 12, said scraping edges functioning to scrape the excess oil from the cylinder wall during operation of the piston. Also, the lower portion 2 of the piston body may be provided with circumferential oil grooves 13.

From the foregoing, it will be understood that the invention serves its purpose. The split annular resilient portion of the piston body functions to form a seal without the use of piston rings or other packing. I do not restrict myself to unessential features, but what I claim and desire to secure by Letters Patent is:—

1. A piston, comprising a split resilient annular member, integrally united with the piston body and having its ends overlapping in contact with each other throughout their length.

2. A piston, comprising a split resilient annular member integrally united with the piston body and having its ends overlapping in contact with each other throughout their length, said annular member being arranged to press outwardly in all directions against a cylinder wall by the resiliency of the metal.

3. A piston, comprising a split resilient annular member, having its ends overlapping throughout their length and superimposed to bear one upon the other throughout their length, said member being integrally united with the piston body.

4. A piston, comprising a split resilient annular member, having its ends overlapping for, relatively, a considerable portion of the circumference of the piston, and being superimposed one upon the other and in contact throughout their length, said annular member being integrally united with the piston body.

5. A piston, comprising a split resilient annular member having its ends overlapping and pressing one against the other for relatively a considerable portion of the circumference of the piston, said annular member being integrally united with the piston body and being arranged to press outwardly in all directions against a cylinder wall.

6. A piston, comprising a split resilient annular member, integrally united with the piston body, having its ends overlapping throughout their length, and a head plate in connection with the piston body.

7. A piston, comprising a split resilient annular member integrally united with the piston body and having its ends overlapping throughout their length, said annular member being arranged to press outwardly in all directions against a cylinder wall by the resiliency of the metal, and a head plate in connection with the piston body.

8. A piston, comprising a split resilient annular member, having its ends overlapping throughout their length and superimposed one upon the other, said member being integrally united with the piston body, and a head plate in connection with the piston body.

9. A piston, comprising a split resilient annular member, having its ends overlapping for, relatively, a considerable portion of the circumference of the piston, and being superimposed one upon the other, said annular member being integrally united with the piston body, and a head plate in connection with the piston body.

10. A piston, comprising a split resilient annular member, having its ends overlapping and superimposed one upon the other for, relatively, a considerable portion of the circumference of the piston, said annular member being integrally united with the piston body and being arranged to press outwardly in all directions against a cylinder wall, and a head plate in connection with the piston body.

JOHN FLAMMANG.